No. 811,760. PATENTED FEB. 6, 1906.
F. X. BEERKLE, Jr.
RAKE ATTACHMENT.
APPLICATION FILED OCT. 16, 1905.
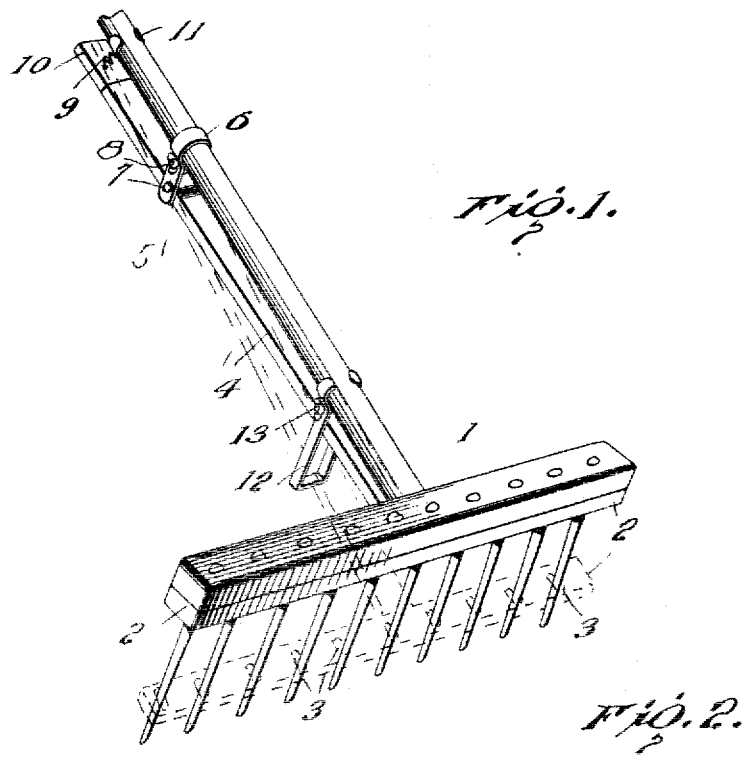
FIG. 1.
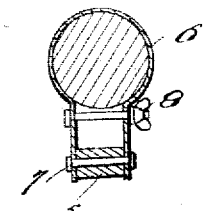
FIG. 2.
FIG. 3.
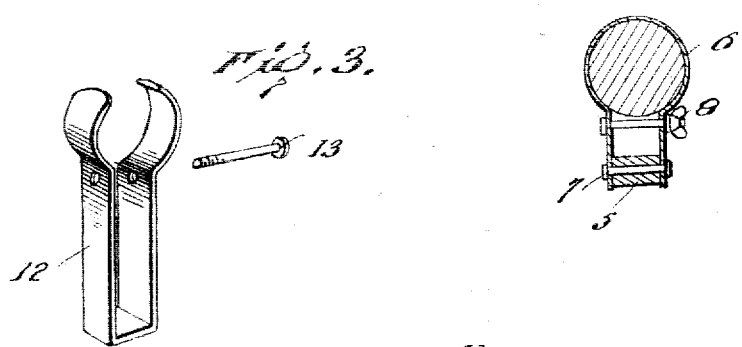
FIG. 4.
Witnesses
Inventor
F. X. Beerkle jr.
By
Attorneys

UNITED STATES PATENT OFFICE.

FRANK X. BEERKLE, JR., OF HITEMAN, IOWA.

RAKE ATTACHMENT.

No. 811,760.  Specification of Letters Patent.  Patented Feb. 6, 1906.

Application filed October 16, 1905. Serial No. 283,047.

*To all whom it may concern:*

Be it known that I, FRANK X. BEERKLE, Jr., a citizen of the United States, residing at Hiteman, in the county of Monroe and State of Iowa, have invented certain new and useful Improvements in Rake Attachments, of which the following is a specification.

This invention relates to an improved attachment for rakes of that type which is designed to be employed in removing grass or other obstructions from the teeth thereof.

The primary object of this invention is to provide an attachment of this character which is very efficient in operation and which, owing to the fact that it can be readily attached or detached from the rake, can be manufactured and sold separate therefrom.

For a full description of the invention and the merits thereof and also to acquire a knowledge of the details of construction of the means for effecting the result reference is to be had to the following description and accompanying drawings, in which—

Figure 1 is a perspective view of a rake embodying my invention and shows the clearing-plate as thrust outward in dotted lines. Fig. 2 is a transverse sectional view through the clip upon which the operating-lever is fulcrumed. Fig. 3 is a detail perspective view of the guide and stop members. Fig. 4 is a similar view of the coil-spring, which is interposed between the rake-handle and the extremity of the operating-lever.

Corresponding and like parts are referred to in the following description and indicated in all the views of the drawings by the same reference characters.

The numeral 1 designates a rake of the usual type comprising a head having a series of teeth projecting therefrom and connected to a handle. A clearing-plate 2, provided with a series of laterally-elongated openings 3, operates upon the teeth of the rake and is connected to a lever 4, which extends longitudinally along the rake-handle. This lever 4 is provided at an intermediate point with a fulcrum-block 5, which is pivotally mounted between the opposite arms of the U-shaped clip by means of a removable pin 7. The clip 6 fits around the rake-handle and is preferably formed of spring metal, so that, owing to its resiliency, it can readily accommodate itself to various sizes of handles. The opposite arms of the clip 6 are connected at a point near the rake-handle by means of a bolt 8, which enables the clip to be clamped to the handle at any desired point. A coil-spring 9 is interposed between the end of the operating-lever 4 and the rake-handle and has one of its ends secured to a thimble 10, which fits over the extremity of the lever 4, while its opposite end is connected to a spring clamping member 11, which fits around the rake-handle. It will thus be apparent that by pressing inward upon the free end of the lever 4 the clearing-plate 2 will traverse the rake-teeth toward the points thereof and remove any grass or obstructions which may have accumulated thereon. In order to insure a positive movement of the clearing-plate and to prevent same from being thrust past the end of the teeth, a guide or stop member 12 is employed. This member 12 comprises spaced and approximately parallel arms having their outer ends connected by a cross-bar, while their opposite ends are curved to form jaws which fit around the rake-handle. A clamping-screw 13 connects the parallel arms at a point adjacent to the jaws, so that the member 13 can be securely clamped in position at any desired point upon the rake-handle, and by moving it back and forth it will be apparent that the throw of the clearing-plate 2 can be adjusted. Attention is again called to the fact that the essential feature of this invention resides in the peculiar construction of the various parts which enables the attachment to be readily removed from or attached to the rake.

Having thus described my invention, what I claim as new is—

The combination of a rake, a clearing-plate operating upon the teeth thereof, an operating-lever connected to the clearing-plate and provided at an intermediate point with a fulcrum-block, a U-shaped clip fitting around the rake-handle and having the fulcrum-block pivoted between its arms, a coil-spring interposed between the end of the operating-lever and the rake-handle, said spring being connected at one end to a thimble fitting over the extremity of the operating-lever while its opposite end is connected to a spring clamping member which engages with the rake-handle, and a guide and stop member fitting around a portion of the operating-lever adjacent the clearing-plate and being adapted to limit the outward throw of the latter by longitudinal adjustment upon the rake-handle.

In testimony whereof I affix my signature in presence of two witnesses.

FRANK X. BEERKLE, Jr. [L. S.]

Witnesses:
 PHIL. H. WATERMAN,
 J. H. McCARTY.